United States Patent Office 2,918,090
Patented Dec. 22, 1959

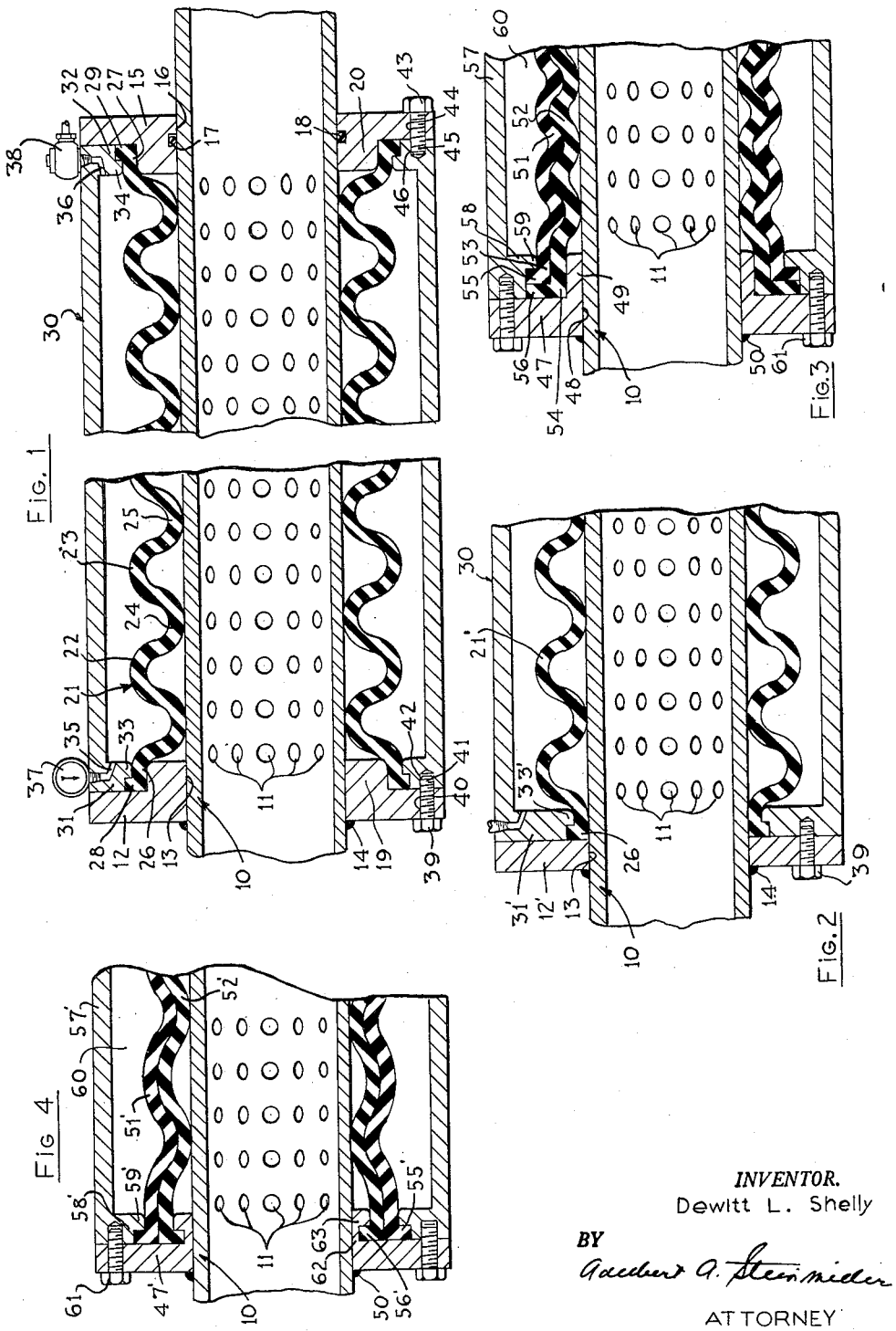

2,918,090

FLUID PRESSURE SHOCK DAMPENING DEVICE AND RESILIENT SLEEVE MEANS FOR USE THEREIN

De Witt L. Shelly, Pittsburgh, Pa., assignor to Westinghouse Air Brake Company, Wilmerding, Pa., a corporation of Pennsylvania Application December 29, 1955, Serial No. 556,265

1 Claim. (Cl. 138—30)

This invention relates to fluid pulsation and shock dampening and surge absorbing apparatus for use in pipe lines and piping systems, and more particularly to apparatus of such a type which includes resilient means adapted to change its position to accommodate temporary increases in a fluid volume resulting from momentary surges and pulsations.

Prior art devices having resilient members, for example, resilient sleeves composed of rubber or other material, are well known but have a number of shortcomings and disadvantages. Such a resilient sleeve is subject to chemical attack by the fluid in the line, and is also subject to mechanical stresses resulting from circumferential expansion and contraction, from frictional contact with a supporting member or mandrel, and from frictional contact with an enclosing cylinder or housing wall which surrounds the resilient member in sealed engagement therewith to form a chamber into which other fluid, for example, compressed air, is introduced for applying a pressure to the outside of the resilient sleeve to assist it in forcing fluid back into the line after the surges have passed. During the surge the sleeve may be stretched beyond its limit of elasticity so that it does not return to normal size or shape after the surge has passed, and during the rarefaction which follows the surge of pressure, the sleeve of the prior art may be forced against the mandrel, sharp folds occurring in it.

The apparatus of the instant invention overcomes these and other disadvantages of the prior art by the use of a sleeve member having a plurality of annular ridges or corrugations spaced along the longitudinal axis thereof. These ridges or corrugations define and control the lines along which the sleeve will contract or collapse, thus prolonging the life of the sleeve. The corrugations also prevent undue stresses within the body of the sleeve and prevent chafing between the folds of the sleeve formed during the collapse. The sleeve is supported by a mandrel and is enclosed in chamber forming means which has introduced therein fluid under pressure, for example, compressed air, for exerting a pressure on the outside of the sleeve, to assist the sleeve in discharging fluid back into the line after the surges of pressure have passed.

Accordingly, a primary object of the invention is to provide new and improved pulsation dampening and surge absorbing apparatus.

Another object is to provide new and improved pulsation dampening and surge absorbing apparatus of the type in which resilient means changes its position to thereby provide an increased volume as fluid flows into the means when a pressure surge occurs in order to provide for dampening the surge.

Another object is to provide new and improved pulsation dampening and surge absorbing apparatus which is characterized by long and trouble-free life.

Still another object is to provide pulsation dampening and surge absorbing apparatus having new and improved resilient sleeve means for use therein.

A further object of the invention is to provide new and improved resilient sleeve means for use in pulsation dampening and surge absorbing apparatus.

Still a further object is to provide a new and improved resilient sleeve having corrugations in the wall thereof to control and define the expansion and contraction of the sleeve and to prevent chafing against the surface of a supporting mandrel.

Still a further object is to provide new and improved resilient sleeve means having high chemical resistance and high strength for use in pulsation dampening and surge absorbing apparatus.

Other objects and advantages will become apparent after a perusal of the accompanying specification when read in connection with the accompanying drawings, in which:

Fig. 1 is a broken cross section through the longitudinal axis of the preferred embodiment of the invention.

Fig. 2 is a partial cross-sectional view through the longitudinal axis of a modification of the invention of Fig. 1;

Fig. 3 is a partial cross-sectional view through the longitudinal axis of a modification of the invention of Fig. 1, in which two resilient sleeves are employed; and Fig. 4 is a partial cross-sectional view taken along the longitudinal axis of the apparatus and showing a modification of the invention of Fig. 3 in which the two sleeves have end flanges extending in opposite directions.

Referring now to the drawings for a more detailed understanding of the invention, and in which like reference characters are used throughout to designate like parts, there is shown a mandrel or perforated pipe section generally designated by the reference numeral 10. This mandrel or perforated pipe section may be connected in the fluid line in any convenient manner so that fluid from which surges are to be removed flows into the mandrel. For example, the member 10 may have threaded ends, not shown, for use with conventional pipe couplings.

Whereas for convenience of illustration only the embodiment of the invention is shown in which fluid flows through the device, it is to be understood that one end of the apparatus could be closed as by a cap or any other convenient means, and the other end connected to the fluid line by, for example, a T-joint.

The aforementioned member 10 has a perforated portion which has therein a plurality of throttling orifices 11, which may be arranged in circumferentially-spaced rows. However, the invention is not to be limited to a device in which the orifices are arranged in rows. An end plate or end disc 12 has a bore or aperture 13 therein in which is snugly fitted one end of member 10, and which is secured to member 10 by any suitable means such as by welding at 14.

Mounted upon the other end of member 10 is the second end plate or end disc 15 having a bore or aperture 16 therein for snugly receiving the other end of member 10. End plate 15 has an annular groove or recess 17 therein for receiving sealing ring 18. The aforementioned other end plate 12 may if desired have a groove (not shown) for receiving a sealing ring (not shown).

End plates 12 and 15 have inwardly extending portions of reduced diameter desginated 19 and 20 respectively, for reasons to be hereinafter apparent. Disposed around the perforated portion of member 10 is a resilient sleeve generally designated by the reference numeral 21 and having a number of corrugations, two of which are designated 22 and 23, running along the length thereof, each corrugation being annular in shape, and the dips between the corrugations, two of which are designated 24 and 25, preferably resting lightly adjacent the outside surface of the perforated portion of member 10.

The aforementioned resilient sleeve 21 has the ends 26 and 27 thereof resting on the aforementioned end plate portions 19 and 20 respectively; the ends 26 and 27 have outwardly extending flanges 28 and 29 respectively for purposes to be hereinafter apparent. Disposed around the sleeve 21 and spaced therefrom is a cylinder or housing generally designated by the reference numeral 30, the housing 30 having inwardly extending flanges 31 and 32 on the ends thereof, said flanges 31 and 32 abutting against the aforementioned end plates 12 and 15 respectively. Flange 31 has an overhanging or extended lip portion 33 adapted to catch, hold and compress the flange 28 of sleeve 21, while flange portion 32 has an extended annular lip portion 34 adapted to catch, hold, and compress the flange 29 of sleeve 21, thereby providing sealed engagement with the sleeve and forming a sealed chamber in housing 30. Housing or cylinder 30 has bores or passages 35 and 36 therein to which are connected respectively a pressure gauge 37 and a valve member 38 which it is to be understood is connected to a source of fluid under pressure (not shown) for example, compressed air, for admitting compressed air into the aforementioned chamber in housing 30 to provide means for exerting pressure inward on sleeve 21.

A number of bolts 39 periphreally spaced around the aforementioned end plate 12 pass through bores 40 in the end plate and have the threaded ends 41 thereof in engagement with threaded bores 42 in the aforementioned flanged end 31 of housing 30. An additional number of bolts 43 spaced at intervals around the periphery of end plate 15 pass through bores 44 in the end plate and have their threaded ends 45 in engagement with threaded bores 46 in the aforementioned flanged end 32 of housing 30, thereby securely holding the housing member 30 to the end plates 12 and 15 and also securing them in predetermined relative positions on the mandrel or perforated pipe section 10.

In the operation of the above-described apparatus, assume by way of explanation that the chamber in housing 30 is filled with compressed air to a pressure corresponding approximately to the mean or normal pressure of the fluid in mandrel 10. Surges of pressure within the fluid in mandrel 10 will cause flow through the apertures or throttling orifices 11 into the volume between the mandrel 10 and sleeve 21, and may cause the sleeve 21 to expand so that the peaks of the corrugations may rest against housing or cylinder member 30. During the rarefactions or dips in pressure which follow the surges, the air pressure in the chamber, pressing against the sleeve 21, will force the fluid in the volume between the sleeve 21 and the mandrel 10 back into the line, and may force the sleeve 21 into a position closer to the mandrel than that shown in Fig. 1. In the latter event the aforementioned corrugations prevent sharp creases or folds from occurring in the sleeve 21, and they also reduce to a minimum the frictional contact occurring between the sleeve 21 and the mandrel 10 when the sleeve collapses. They further reduce to a minimum frictional contact between the sleeve 21 and the cylinder or housing 30 when the sleeve 21 expands in response to fluid flowing into the apparatus as surges of pressure occur in the fluid in the line.

Particular reference should be made now to Fig. 2 in which a modification of the apparatus of Fig. 1 is shown. It should be noted that the resilient sleeve designated by the reference numeral 21' has its end 26 disposed adjacent the outer surface of the mandrel or perforated pipe section 10, and that the end plate 12' does not have an inwardly extending portion of reduced diameter as it did in Fig. 1. The flanged end 31' of cylinder or housing 30 extends somewhat further inward than the corresponding flanged end of Fig. 1, and the lip portion 33' as before engages, holds, and compresses the flanged end of sleeve 21'. The remainder of the apparatus of Fig. 2 is similar to the corresponding portion of the apparatus of Fig. 1.

Particular reference should be made now to Fig. 3 in which an additional modification of the invention is shown, utilizing two corrugated sleeves. The end plate or end disc 47 has an aperture 48 therein for snugly receiving the mandrel or perforated pipe section 10 which may be similar to the pipe section 10 of Fig. 1. End plate 47 has an inwardly extending annular flange 49 for purposes to be hereinafter apparent. Preferably end plate 47 is secured to member 10 as by welding 50. Two resilient sleeves, an outer sleeve 51 and an inner sleeve 52, are provided having end portions 53 and 54, respectively, said end portions having outwardly extending flanges 55 and 56 respectively. Disposed around the sleeves 51 and 52 is a cylinder or housing member 57 having on the ends thereof inwardly extending flange portions 58 having overhanging lip portions 59 which are adapted to hold and compress the flanges 55 and 56 of the sleeves and to thereby provide sealing engagement between the sleeves and the housing 57. The cylinder or housing 57 and outer sleeve 51 form a chamber 60 into which fluid under pressure, for example, compressed air, is introduced in a manner which may be similar to that of the apparatus of Fig. 1 for providing means for applying pressure on the outside of the resilient sleeve 51 thereby also on the outside of sleeve 52. Preferably the inner sleeve 52 is composed of a substance having high resistance to chemical action by the fluid in the mandrel 10, and preferably the outer sleeve 51 is composed of a substance having high resiliency and strength. A lubricant such for example as graphite (not shown) is placed in a layer between sleeves 51 and 52 in one embodiment of the invention, or if desired a sleeve of reinforcing fabric material, for example nylon, may be placed between sleeves 51 and 52. It should be noted that the sleeves 51 and 52 are so proportioned with respect to each other that the circular corrugations are aligned with each other at spaced intervals along the lengths of the two sleeves, so that normally the inside surface of the outer sleeve 51 lies adjacent the outer surface of the inner sleeve 52.

Bolts 61 are provided at spaced intervals around the periphery of end plate 47 for securing end plate 47 to the casing or housing member 57. It is to be understood that the other end of the apparatus of Fig. 3 (not shown) is similar to the end shown so that a device corresponding generally to the apparatus of Fig. 1 is provided.

The operation of the apparatus of Fig. 3 is similar to the operation of the apparatus of Fig. 1; surges of pressure in the fluid in the mandrel 10 cause flow through the throttling orifices 11 into the volume between the mandrel 10 and the inner sleeve 52. The two sleeves 51 and 52 may expand during surges against the pressure in said chamber 60 and during the rarefactions in pressure which follow the surges the pressure in chamber 60 pressing against the sleeve 51 forces fluid out of the volume between the sleeve 52 and the mandrel 10 back into the line. The pressure in chamber 60 may force the sleeve 52 down into a position closer to mandrel 10 than that shown in Fig. 3, but in that event the corrugations in the two sleeves control the compression or collapse of the sleeve preventing sharp folds and creases which would result in breaks in the sleeve, and also reducing to a minimum frictional contact between the sleeve 52 and mandrel 10. It is also to be understood that during expansion of the two sleeves, sleeve 51 may make contact with the wall of cylinder 57 but that in that event the corrugations in sleeve 51 reduce frictional contact to a minimum.

Particular reference should be made now to Fig. 4 in which there is shown a modification of the apparatus of Fig. 3. Two resilient sleeves 51' and 52' corresponding to the sleeves 51 and 52 of Fig. 3 have the flanges 55' and 56' on their ends extending in opposite directions. The end plate 47' has an inwardly extending ring portion 62 having on the inner end thereof an outwardly flaring lip 63 for holding and compressing the flange 56'. The flanged end 58' of casing 57' has an overhanging lip 59' for holding and compressing the flanged end 55' of sleeve 51'. It should be understood that the other end (not shown) of the apparatus of Fig. 4 is similar to the end shown in the drawing. The operation of the apparatus of Fig. 4 is similar to the operation of the apparatus of Fig. 3 hereinbefore described.

It should be understood that any desired ratio may exist between the total area of the throttling orifices 11 and the area of the passage through mandrel 10, no particular ratio of these areas forming a part of this invention.

In summary, it will be seen that there has been hereinbefor stated objectives of the invention. The em-provided apparatus admirably suited to accomplish the bodiments of the invention using a single resilient sleeve, and shown in Figs. 1 and 2, provide a sleeve in which sharp folds and creases are avoided, and a sleeve which has the frictional contact thereof with the mandrel and with the housing wall reduced to a minimum thereby enhancing the life of the sleeve and the useful life of the entire surge dampening apparatus. The embodiments of the invention shown in Figs. 3 and 4 are particularly suitable for use with fluid lines carrying hot oil, chemicals, food, or other similar matter where there is or may be destructive chemical reaction between the fluid and the resilient sleeve. The inner sleeve is composed of a material or substance particularly chosen to be resistant to the chemical in the line, whereas the outer sleeve is composed of a material particularly chosen for its qualities of resiliency and strength.

Having now described the invention, what I claim as new and desire to secure by Letters Patent, is:

A fluid pressure shock dampening device of the type comprising a resilient sleeve member operatively clamped adjacent its ends between a casing means and perforated tubular mandrel so as to sealingly isolate two chambers, one of which is defined between the inner wall of the sleeve member and the exterior of the mandrel and contains fluid at a variable pressure, and the other of which chambers is defined between the outer wall of the sleeve member and inner wall of the casing means and is charged with fluid at a preselected pressure, characterized in that the sleeve member comprises intermediate its ends a plurality of circumferentially extending annular corrugations in spaced relation along the length of the sleeve member and of substantially uniform dimensions and configuration, each corrugation being connected by dips which are adapted to normally engage the outer surface of the mandrel, said annular corrugations and dips being flexible outwardly from their normal positions responsively to an increase of pressure of fluid within the one chamber resulting from a surge-induced increase of pressure within the mandrel, and being responsive to a decrease in fluid pressure within the one chamber resulting from a reduction of pressure within the mandrel following the surge-induced increase of pressure therein to collapse upon the mandrel from the normal configuration thereof in a substantially predetermined pattern for discharging fluid under pressure from the one chamber back into the mandrel via the perforations in the mandrel.

References Cited in the file of this patent

UNITED STATES PATENTS

| | | |
|---|---|---|
| 1,864,861 | Schaller | June 28, 1932 |
| 2,343,320 | Parker | Mar. 7, 1944 |
| 2,383,180 | Ellinwood | Aug. 21, 1945 |
| 2,532,143 | Breit | Nov. 28, 1950 |
| 2,609,001 | Hebard | Sept. 21, 1952 |
| 2,697,449 | Svenson | Dec. 21, 1954 |
| 2,712,831 | Day | July 12, 1955 |